(12) United States Patent
Caillot

(10) Patent No.: US 10,875,504 B2
(45) Date of Patent: Dec. 29, 2020

(54) WIPER BLADE END CAP

(71) Applicant: Valeo Systèmes d'Essuyage, Le Mesnil Saint Denis (FR)

(72) Inventor: Gérald Caillot, Le Mesnil Saint Denis (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 322 days.

(21) Appl. No.: 15/707,507

(22) Filed: Sep. 18, 2017

(65) Prior Publication Data

US 2018/0079391 A1 Mar. 22, 2018

(30) Foreign Application Priority Data

Sep. 19, 2016 (FR) .................................... 16 58770

(51) Int. Cl.
  *B60S 1/38* (2006.01)
  *B60S 1/52* (2006.01)
(52) U.S. Cl.
  CPC ........... *B60S 1/3894* (2013.01); *B60S 1/3887* (2013.01); *B60S 1/524* (2013.01)
(58) Field of Classification Search
  USPC .......... 15/250.43, 250.44, 250.201, 250.452, 15/250.453, 250.04
  See application file for complete search history.

(56) References Cited

U.S. PATENT DOCUMENTS

| 5,903,953 A | * | 5/1999 | Dimur | ....................... B60S 1/32 |
| | | | | 15/250.04 |
| 2014/0230174 A1 | * | 8/2014 | Bommer | ............... B60S 1/3851 |
| | | | | 15/250.04 |

FOREIGN PATENT DOCUMENTS

| DE | 102012100777 A1 | 8/2013 | |
| DE | 102013215196 A1 | 2/2015 | |
| FR | 3013288 A1 | 5/2015 | |
| WO | 2013186498 A1 | 12/2013 | |
| WO | WO-2013186498 A1 * | 12/2013 | .............. B60S 1/524 |

OTHER PUBLICATIONS

Translation of WO2013186498, retrieved from Espacenet on Jul. 2, 2019 (Year: 2013).*
Preliminary Report issued in Corresponding French Application No. 1658770, dated May 17, 2017 (6 Pages).

* cited by examiner

*Primary Examiner* — Gary K. Graham
*Assistant Examiner* — Thomas Raymond Rodgers
(74) *Attorney, Agent, or Firm* — Osha Bergman Watanabe & Burton LLP

(57) ABSTRACT

A wiper blade end cap (22 and 22'), comprising at least one sealing element (22a) for sealing a channel for delivering windscreen washer fluid of a member of the blade (10), characterised in that said at least one sealing element (22a) comprises a channel (22a1), referred to as the end channel, intended to be brought into communication with said delivery channel when said delivery channel is sealed, and at least one spray opening (22a2 and 22a2') originating at said end channel (22a1) and emerging on the outside of said cap (22 and 22').

17 Claims, 5 Drawing Sheets

WIPER BLADE END CAP

TECHNICAL FIELD

The present invention relates to the field of cleaning a vehicle windscreen, in particular a motor vehicle windscreen. It concerns a wiper blade end cap, and a wiper blade member comprising at least one channel for delivering windscreen washer fluid and provided with said end cap. It also concerns a method for manufacturing the end cap.

PRIOR ART

Typically, a wiper blade for a window such as the windscreen of a motor vehicle comprises a wiper strip, generally made from rubber, intended to rub against the window of the vehicle in order to remove the water, conveying it outside the field of view of the driver. The blade further comprises a longitudinal vertebra that stiffens the wiper strip, so as to promote the application of said strip onto the windscreen, and a support frame for the vertebra and the strip. The blade also comprises a longitudinal cover member comprising an upper aerodynamic deflector intended to better press the blade against the windscreen and thus improve the aerodynamic performance of the system.

The blade is attached to a rotating arm of the wiper by an assembly consisting of a mechanical connector and an adapter. The connector is a part that is directly attached to the structure of the blade, the adapter being an intermediate part that allows the connector to be attached to the wiper arm. These two parts are connected together by a transverse pin that allows them to rotate relative to each other.

The stiffening vertebra, the wiper strip and the support frame of the blade are components of the blade that have a longitudinal main orientation. The vertebra and the strip are inserted slidingly in a longitudinal direction into complementary longitudinal housings of the frame.

The cover member, and the vertebra and the strip inside the housings of the frame, are blocked in a longitudinal direction by end caps mounted on each end of the blade.

Each cap is produced so as to be locked onto the associated end of the vertebra and so as to form a longitudinal stop for the associated ends of the cover member, the frame and the strip. The cap can alternatively be glued to the end of the blade.

A second type of wiper blade is also known, comprising two longitudinal vertebrae, each housed respectively in a lateral groove of the wiper strip. In this type of blade architecture, the longitudinal cover member of the blade can be attached directly to the vertebrae by means of longitudinal lateral hooks that each receive one end of the vertebra.

Moreover, spraying windscreen washer fluid from nozzles attached to a stationary part of the motor vehicle such as the bonnet is known.

Such a device has the considerable disadvantage of requiring nozzles that are necessarily located at a distance from the windscreen, making it difficult to spray the windscreen in a uniform manner.

Furthermore, the sprayed fluid tends to be driven largely towards the bottom of the windscreen when the vehicle is travelling at high speed.

In order to overcome this disadvantage, the incorporation of the system for delivering windscreen washer fluid into a wiper, and in particular into a wiper blade, in the form of one or more spraying ramp(s) formed, for example, in the longitudinal cover member of the blade, has been proposed. Wiper blades have thus been designed comprising a system for delivering windscreen washer fluid onto a motor vehicle window to be wiped, the blades comprising at least one longitudinal and substantially tubular spraying ramp, that comprises an inner channel inside which the windscreen washer fluid flows and spray openings for spraying the vehicle window, and in which the ramp is attached longitudinally to the wiper and is connected to a pressurised windscreen washer fluid supply circuit by means of a supply pipe.

The disadvantage of the systems for delivering windscreen washer fluid from the prior art is that the fluid is not delivered along the entire length of the blade. In particular, the fluid is not delivered at the end caps. This affects the effectiveness of the washing, and the accuracy of the sensors collecting visual information through the windscreen can therefore be compromised.

The aim of the present invention is to overcome these disadvantages by proposing a wiper blade end cap that helps expand the area over which windscreen washer fluid is delivered.

DISCLOSURE OF THE INVENTION

The invention therefore concerns a wiper blade end cap, comprising at least one sealing element for sealing a channel for delivering windscreen washer fluid of a member of the blade.

In the end cap according to the invention, said at least one sealing element comprises a channel, referred to as the end channel, intended to be brought into fluid communication with said delivery channel when said delivery channel is sealed, and at least one spray opening originating at said end channel.

Therefore, advantageously, the presence of an end channel in the sealing element, said end channel emerging on the outside of the cap via the spray opening(s), helps extend the delivery of windscreen washer fluid at the cap. The delivery of fluid is extended in a simple manner, by bringing the delivery channel into communication with the end channel when the delivery channel is sealed.

Since the cap has a longitudinal main orientation, each sealing element and each end channel advantageously has a longitudinal orientation.

Said at least one spray opening can be in the form of a channel and have an orientation that is inclined relative to the longitudinal orientation.

Said at least one spray opening can have an orientation that is substantially orthogonal to the longitudinal orientation.

The cap preferably comprises two sealing elements.

The cap preferably comprises a first face defining a housing intended to receive the end of the blade member, and a second face opposite the first face according to the longitudinal main orientation of the cap and closed by an end wall, the first face and the second face being connected to each other by lateral walls.

Each sealing element can extend substantially along a lateral wall of the cap and emerge at the first face of the cap.

Said at least one spray opening emerges on the outside of said cap, preferably at a lateral wall of the cap and/or at an end wall.

Each end channel can have a curved, preferably circular, cross-section.

The cap can comprise at least a housing for receiving a vertebra of the blade and a housing for receiving the heel of a wiper strip of the blade. The cap can comprise a sealing element separate from the lateral wall of the cap, the sealing element being separated from the lateral wall by a recess.

The lateral wall can comprise at least one opening, said opening being arranged so as to allow the fluid ejected at the spray opening to be sprayed out of the cap.

The invention also concerns a wiper blade member, comprising at least one channel for delivering windscreen washer fluid. The member according to the invention is provided with at least one end cap as described above.

Each delivery channel can be sealed by means of a sealing element.

Each end channel can be arranged at least partially inside a delivery channel.

The member can comprise, in the vicinity of said at least one cap, at least one spray opening oriented towards said at least one cap.

The member can comprise two channels for delivering windscreen washer fluid, each channel extending substantially along a lateral face of the member.

The member can be a cover member of the blade.

The member can comprise an aerodynamic deflector.

The invention also concerns a wiper blade, comprising at least one end cap as described above.

The invention also concerns a method for manufacturing an end cap as described above. The method comprises the formation of an end channel in said at least one sealing element and the formation of at least one spray opening originating at said end channel and emerging on the outside of said cap.

The invention also concerns a method for assembling an end cap as described above on a wiper blade member comprising at least one channel for delivering windscreen washer fluid. The method comprises a step of sealing said at least one delivery channel of the member with a sealing element of the cap, in such a way as to bring said at least one delivery channel into fluid communication with the end channel of said sealing element.

DESCRIPTION OF THE FIGURES

The invention will be more clearly understood, and other details, features and advantages of the invention will be disclosed, upon reading the description below provided as a non-limiting example, with reference to the appended drawings in which.

DETAILED DESCRIPTION

In the following description, the longitudinal or lateral designations refer to the orientation of the wiper blade according to the invention. The longitudinal direction corresponds to the main axis of the blade along which it extends, whereas the lateral orientations correspond to intersecting straight lines, i.e. lines that cross the longitudinal direction, that are, in particular, perpendicular to the longitudinal direction and that represent the width of the wiper blade. With respect to the longitudinal directions, the external or internal designations should be considered with respect to the point of attachment of the blade to a blade holder arm, the internal designation corresponding to the portion where the arm and a half-blade extend. The directions referenced as vertical designate the direction perpendicular to both the longitudinal direction and the transverse direction. In a wiping system in which the wiper blade is in the working position, i.e. pressed against a glass surface to be wiped/cleaned, the directions referenced as lower more specifically designate the regions close to the surface to be wiped in the vertical direction, and the directions referenced as upper designate the regions away from the surface to be wiped in said same vertical direction. These directions and orientations also naturally apply to the different components that constitute the wiper blade.

In reference to FIGS. 1 to 9, elements that are identical or functional equivalents have been given identical reference numbers.

Figure 1:
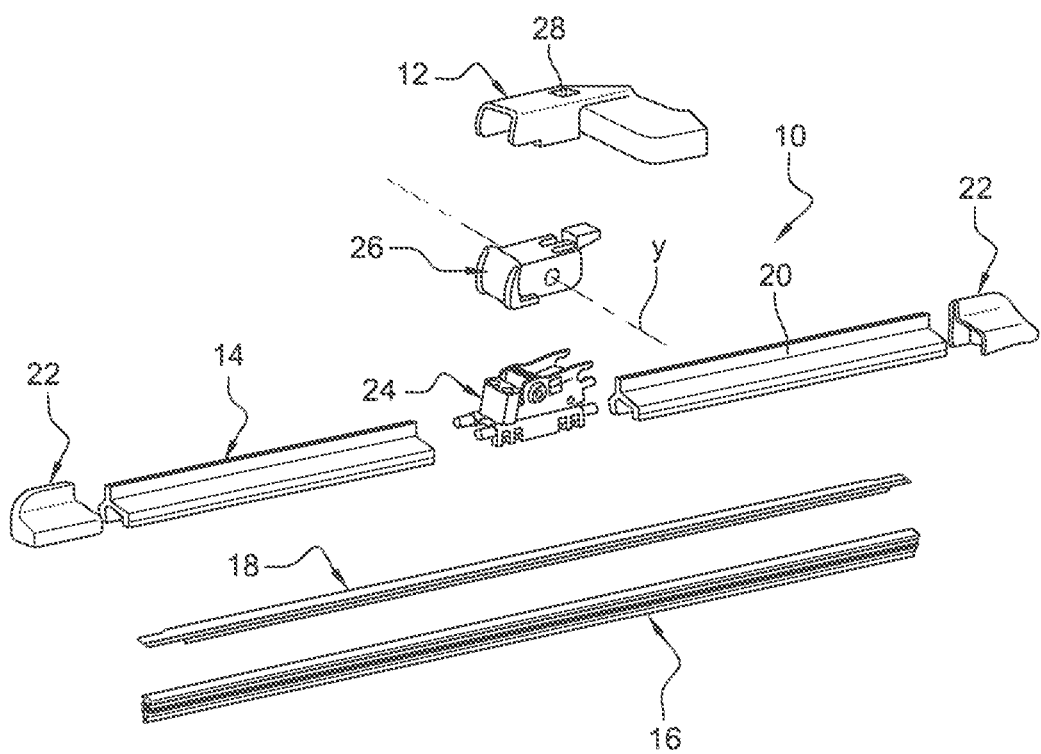
FIG. 1 is a perspective view of a wiper blade connected to a blade holder arm.

FIG. 1 shows an exploded view of a wiper, in particular a motor vehicle windscreen wiper, said wiper comprising a longitudinal wiper blade 10 and a blade holder arm 12 that is partially shown and is intended to be driven by a motor in order to make a reciprocating angular movement allowing water and, optionally, other undesirable elements covering the windscreen to be removed.

The blade 10 in this case comprises a longitudinal cover member 14, a longitudinal scraper strip 16, generally made from rubber, and at least one longitudinal vertebra 18 that stiffens the strip 16 so as to promote the application of said strip 16 onto the windscreen.

The cover member 14 of the blade 10 comprises an upper aerodynamic deflector 20 intended to improve the operation of the wiper, the aim of said deflector 20 being to better press the blade 10 against the windscreen and thus improve the aerodynamic performance of the system.

The blade 10 further comprises hooking or ends caps 22, said caps being intended to secure the strip 16 and the vertebra 18 on the cover member 14, said caps 22 being located at each of the longitudinal ends of the cover member 14.

The cover member 14 of the blade is, in this case, produced from two separate parts that are arranged substantially end-to-end and separated from each other by an intermediate connector 24. This connector 24 is therefore interposed between the two parts of the cover member 14 and can comprise means for fluidically connecting windscreen washer fluid supply means of the connector 24 to conduits of the member 14.

In order to allow the blade 10 to be mounted on the arm 12, said blade comprises an adapter 26 mounted on the connector 24 and allowing the blade 10 to be articulated relative to the arm 12. The articulation of the blade 10 relative to the arm 12 is an articulation allowing a rotational movement about a rotational axis Y perpendicular to the longitudinal axis of the blade 10. Indeed, the blade 10 needs to have at least a degree of rotational freedom relative to the arm 12, and more specifically relative to an end part 28 of the arm 12, in order to allow the blade 10 to follow the curvature of the windscreen.

Figure 2:
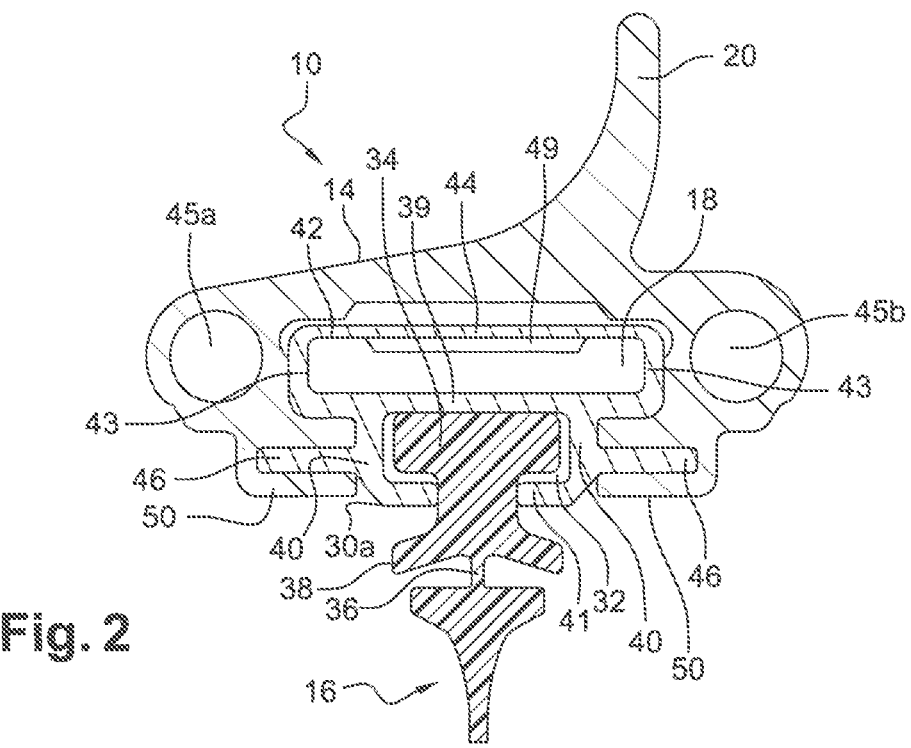
FIG. 2 is a transverse cross-section view of a wiper blade provided with spraying ramps, according to a first embodiment.

FIG. 2 shows a first embodiment of a wiper blade 10, said blade 10 comprising, in addition to the features described above in reference to FIG. 1, a longitudinal support member 30a supporting the strip 16 and the vertebra 18.

The support member 30a comprises two longitudinal lateral ribs 46, for example in the form of two strips. These ribs 46 are substantially coplanar, each rib 46 extending laterally on the opposite side to the other rib.

The cover member 14 can comprise at least one longitudinal channel 45 in which the windscreen washer fluid flows, connected to appropriate delivery means, for example at the connector 24. As illustrated in FIG. 2, the cover member 14 can comprise two channels 45a and 45b with a circular cross-section positioned to either side of the cover member 14, one channel 45a defining a first fluid delivery ramp and the other channel 45b defining a second fluid delivery ramp. When the blade is being used, the fluid delivery ramps can be used simultaneously or alternatively. During alternating operation, for example, it is possible to use only the ramp that is arranged facing the direction of movement of the blade on the windscreen in order for the sprayed fluid to be wiped off quickly so as not to interfere with the drivers view.

The cover member 14 of the blade further comprises, at its lower end, means for hooking onto the support member 30a. In the example shown, the cover member 14 comprises two longitudinal lateral hooks 50 that are intended to engage with the ribs 46 of the support member 30a.

The hooks 50 are substantially coplanar and each defines a slot into which the ribs 46 of the support member 30a can slide and in which said ribs are mounted.

The support member 30a of the blade 10 also comprises a first housing or lower housing 32 for receiving a longitudinal heel 34 of the strip 16. The strip 16 has, for example, a Christmas tree-shaped profile, which is well known to a person skilled in the art. The lower end of same is connected by a hinge 36 and a damping member 38 to the heel 34. In a known manner, during operation, when the strip 16 pivots about the hinge 36, the strip 16 can abut against the member 38.

The housing 32 is configured to receive the heel 34 of the strip 16 by sliding in a longitudinal direction. This housing 32 is defined by a longitudinal bottom wall 39 and by two lateral walls 40. The upper ends of the lateral walls 40 are connected to the bottom wall 39 and their lower ends are each connected to a longitudinal rim 41. These rims 41 are substantially coplanar and extend towards each other. Together, they define a slot through which a narrowed portion of the heel 34 can slide and is mounted.

The support member 30a comprises a second housing or upper housing 42 for receiving the vertebra 18, which thus extends above the heel 34 of the strip 16.

The housing 42 is configured to receive the vertebra 18 by sliding in a longitudinal direction. This housing 42 is defined by the abovementioned bottom wall 39, by two lateral walls 43, and by an upper wall 44. The lower ends of the lateral walls 43 are connected to the bottom wall 39 and their upper ends are each connected to the upper wall 44.

The vertebra 18 has a curved shape at rest and comprises a convex curved upper face and a concave curved lower face.

Optionally, a heating element 49 such as a heating film made from a resistive material can be attached to the upper face of the vertebra 18.

Figure 3:
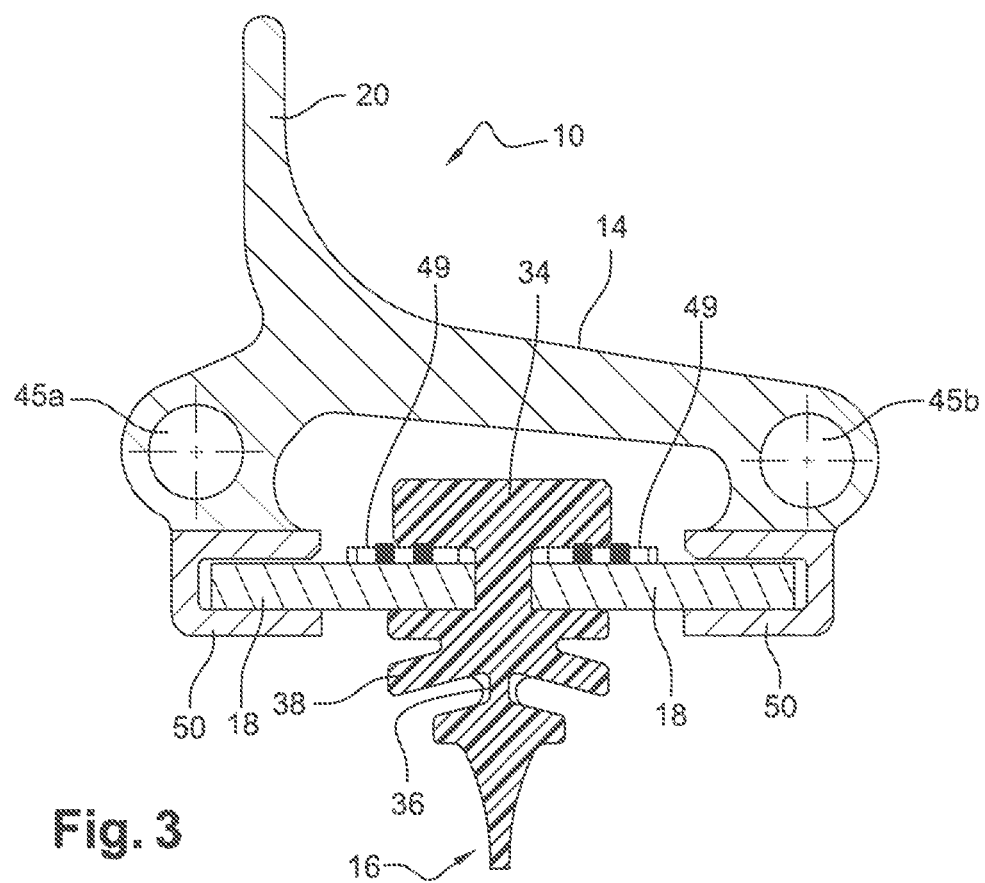
FIG. 3 is a transverse cross-section view of a wiper blade provided with spraying ramps, according to a second embodiment.

In a second embodiment illustrated in FIG. 3, in which the elements identical to those in FIG. 2 have been given the same reference numbers, the blade 10 can comprise two vertebrae 18. This type of blade is not provided with a support member. Each vertebra 18 is inserted longitudinally into a hook 50 of the cover member 14 and into the heel 34 of strip 16. The invention can be applied, in particular, to these two embodiments.

Figure 4:
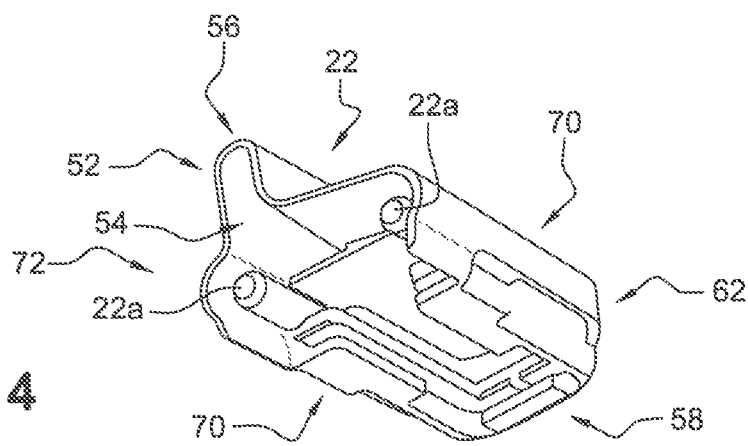
FIG. 4 is a perspective view of a wiper blade end cap, according to a first embodiment.

The blade 10 is provided at each of its longitudinal ends with an end cap 22. Each end cap 22 comprises at least one sealing element 22a, and typically two, in the form of stoppers extending longitudinally and that are intended to seal the longitudinal ends of the channels 45a and 45b (FIG. 4).

Each end cap 22 overlaps, in particular, the end of the vertebra(e) 18 and/or of the cover member 14 and/or of the strip 16 and/or of the support member 30a, that constitute the wiper blade. Such a cap 22 holds at least a part of these elements together.

Reference will next be made to a front part of the cap and to a rear part of the cap. The front part of the end cap 22 corresponds to the region of the cap into which the end of the vertebra(e) 18 and/or of the cover member 14 and/or of the strip 16 and/or of the support member 30a, that constitute the wiper blade, are inserted; the rear part of the cap corresponds to the part of the cap opposite said front part in the longitudinal main orientation of the cap 2.

The end cap 22 shown in FIGS. 4 and 6 to 8 is intended to be mounted on the blade shown in FIG. 3, i.e. the blade comprising two vertebrae and not provided with a support member.

The end cap 22 comprises an upper wall 52, the front part of which defines an open space 54 inside which at least the cover member 14 of the wiper blade is housed. The shape of the wall 52 therefore matches the external shape of the cover member 14. For this reason, the cap comprises a deflector wing 56 that covers the vane formed on the cover member 14 of the wiper blade according to the invention.

The rear part of the end cap 22 is closed by an end wall 58 that joins the lateral sides 70 of the cap by means of rounded edges 62. The end wall 58 is opposite the face 72 receiving the elements that constitute the blade, i.e. the end of the vertebra(e) and/or of the cover member 14 and/or of the strip 16. Preferably, each lateral side 70 is constituted by a solid wall.

Figure 7:
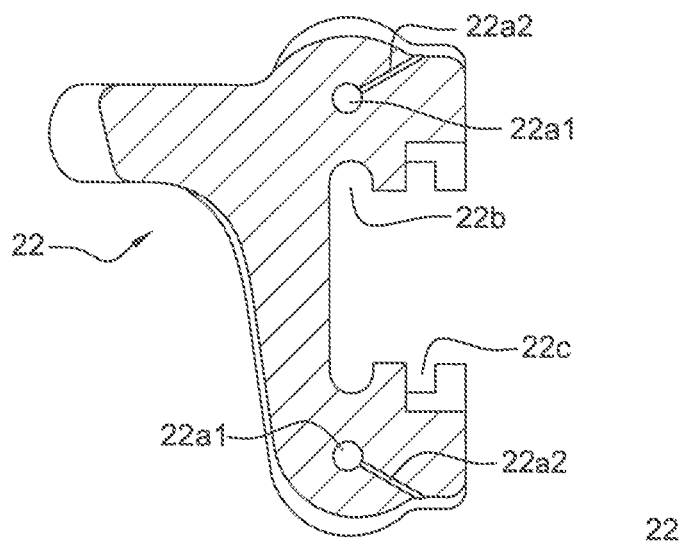
FIG. 7 is a view of the end cap of FIG. 6 along cross-section A-A.

As shown in FIG. 7, the lower part of the cap 22 advantageously comprises a housing 22b for receiving the heel 34 of the wiper strip 16 and a housing 22c for receiving the vertebrae 18.

The lower part of the cap 22 will be adapted depending on the type of blade, i.e. the blade shown in FIG. 2, comprising a single vertebra held in a support member, or that shown in FIG. 3, comprising two vertebrae held directly by the strip 16.

Figure 5:
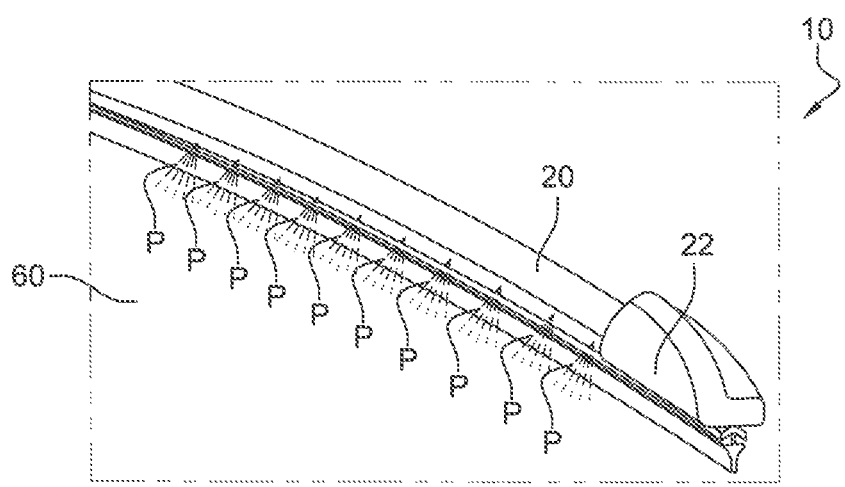
FIG. 5 is a partial perspective view of a blade provided with a system for delivering windscreen washer fluid from the prior art, in the operational configuration of the blade.

As shown in FIG. 5, the sprays of fluid P exit from openings formed in the deflector 20 and optionally in the connector and are directed towards a window 60 such as a windscreen. In this spraying device from the prior art, the fluid is not delivered at the end caps 22. This affects the effectiveness of the washing, and the accuracy of the sensors detecting information through the windscreen can therefore be compromised. These sensors can include rain sensors, sensors for activating and deactivating safety systems, or indeed sensors for detecting windscreen fog or pollution. If the windscreen is not properly cleaned, the information supplied by these sensors can be altered.

Figure 6:
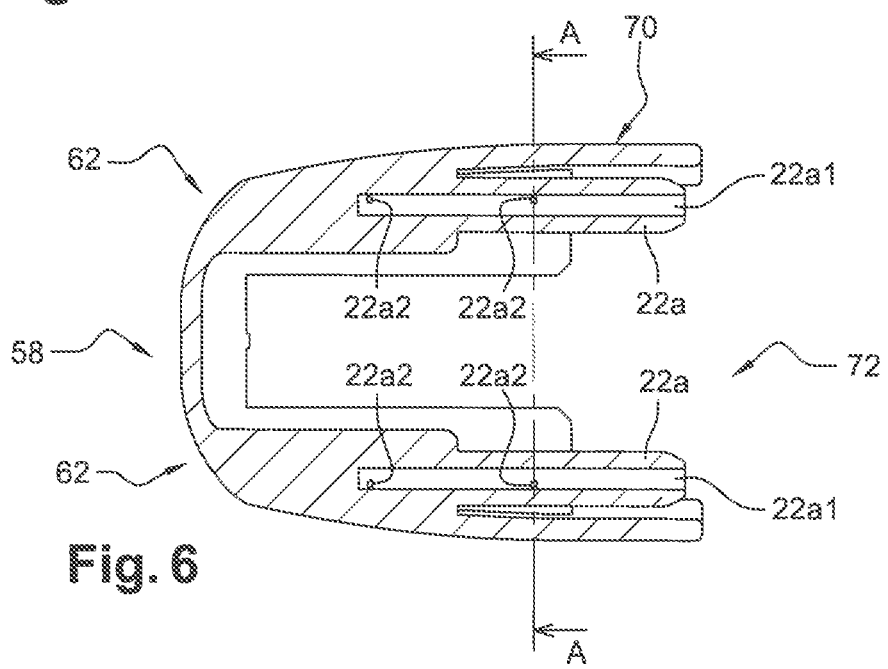
FIG. 6 is a bottom view in longitudinal cross-section of a wiper blade end cap according to the invention.

To overcome this, and according to the invention, each stopper 22a is provided with a longitudinal channel 22a1 in which the fluid flows, referred to as an end channel. Spray openings 22a2 in the form of channels, in particular thinner than the end channel 22a1, emerge into each end channel 22a1 and connect the end channel 22a1 to the outside of the cap 22 (FIGS. 6 to 8).

Each end channel 22a1 has a curved, preferably circular, cross-section.

Figure 8:
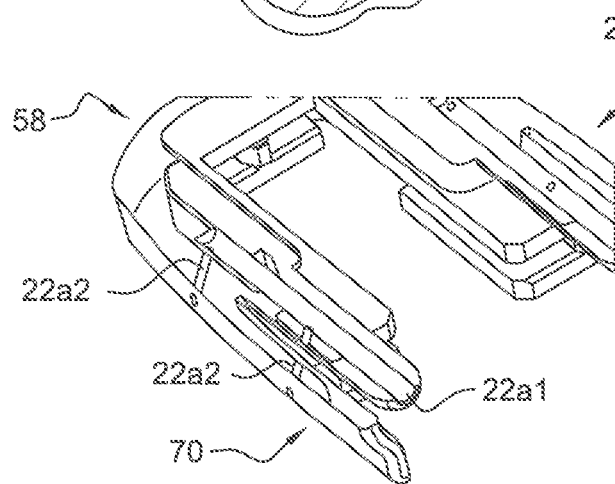
FIG. 8 is a partial perspective view of the end cap of FIG. 6.

Preferably, and as illustrated in FIG. 8, each spray opening 22a2 emerges at a lateral side 70 of the cap.

Additionally, a spray opening 22a2 can also emerge at the end wall 58 of the cap located opposite the face 72 receiving the elements that constitute the blade, i.e. the end of the vertebra(e) and/or of the cover member 14 and/or of the strip 16.

Thus, the stoppers 22e continue to perform their function of sealing the channels 45a and 45b of the deflector 20 of the blade 10 but, as a result of the presence of the end channels 22a1, the channels 45a and 45b are extended into the cap 22. The fluid from the channels 45a and 45b of the deflector 20 can thus flow into the end channels 22a1 and ensure fluid is delivered at the end caps 22 via the spray openings 22a2. In this way, fluid is delivered along the entire length of the blade 10.

The cap 22 can comprise two stoppers 22a, each stopper 22a extending substantially parallel to a lateral face 70 of the cap 22. Each channel 22a1 formed in the stopper 22a thus extends longitudinally according to the longitudinal main orientation of the cap 22. Each channel 22a1 emerges at an open end of the stopper 22a, on the side of the fluid delivery channel 45a and 45b of the member to be sealed, i.e. at the face 72 of the cap receiving the elements that constitute the blade, i.e. the end of the vertebra(e) and/or of the cover member 14 and/or of the strip 16.

The spray openings 22a2 can be created by injection or by drilling, for example by laser or mechanical drilling or by thermal deformation carried out in the lateral face(s) 70 of the cap 22. When the cap 22 is mounted on the blade, the stoppers 22a are inserted into the channels 45a and 45b of the cover member 14 of the blade. The end channels 22a1 of the cap 22 are thus arranged longitudinally to the blade 10, in the extension of the channels 45a and 45b.

The spray openings 22a2 are arranged substantially orthogonal to the channels 22a1 (FIGS. 7 and 8).

Figure 9:
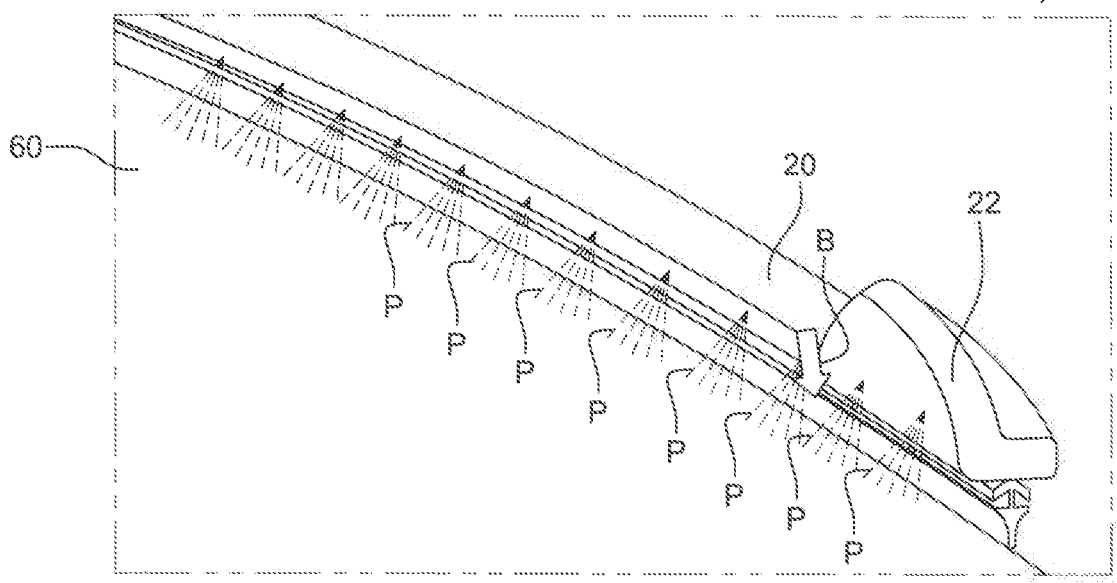
FIG. 9 is a partial perspective view of a blade provided with an end cap according to the invention, in the operational configuration of the blade.

FIG. 9 shows the blade 10 during operation of the spraying device. The sprays of fluid P are discharged onto the windscreen 60 along the entire length of the blade 10, including at the end cap 22, as a result of the cap 22 according to the invention.

In order to increase the spraying at an end cap 22, the deflector 20 can comprise, close to the cap 22, at least one spray opening oriented in a direction B, towards the cap 22.

Figure 10:
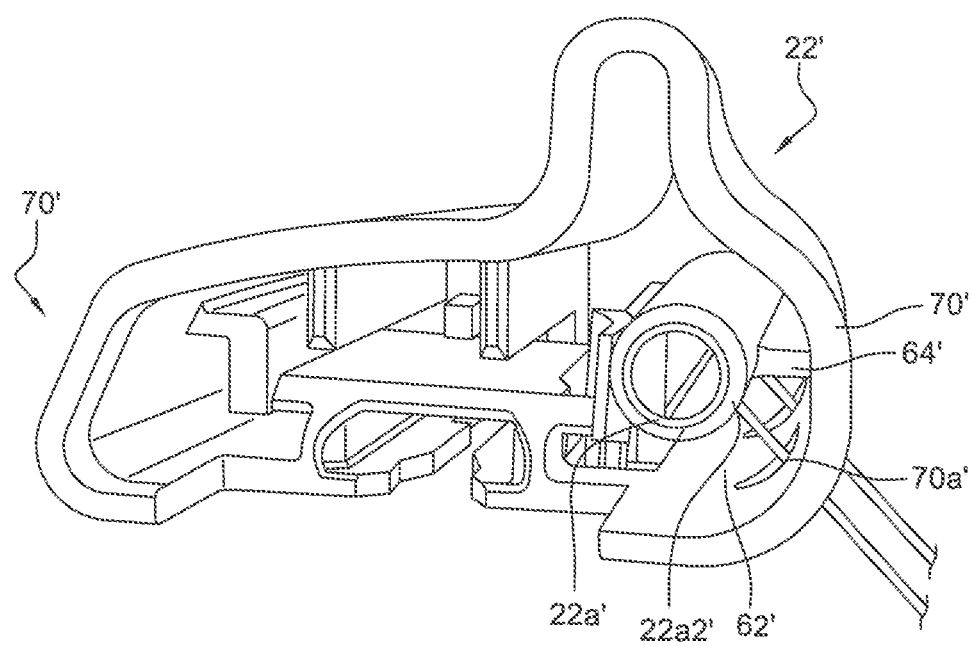
FIG. 10 is a perspective view of a wiper blade end cap, according to a second embodiment.

FIG. 10 shows a second embodiment of an end cap 22' in which the sealing element 22a' is separate from the lateral wall 70' of the cap 22, i.e. located at a distance from the lateral wall 70' of the cap 22. As in the first embodiment, the sealing element 22a' extends substantially longitudinally according to the longitudinal main orientation of the cap 22, parallel to the lateral wall 70' of the cap 22'. The sealing element 22a' is separated from the lateral wall 70' by a recess 62'.

In this embodiment, the sealing element 22a' is connected to the lateral wall 70' by a rib 64'.

For example, the rib 64' extends longitudinally according to the longitudinal main orientation of the cap 22 while being substantially perpendicular to the lateral wall 70', The sealing element 22a' comprises at least one spray opening 22a2' out of which the windscreen washer fluid flows; in the embodiment in FIG. 10, two spray openings 22a2' are present.

Each spray opening 22a2' is arranged facing an opening 70a' provided in the lateral wall 70' of the cap 22'. The opening 70a' is arranged so as to allow the fluid ejected at the spray opening 22a2' to be sprayed out of the cap, onto the window.

The invention claimed is:

1. A wiper blade end cap, comprising:
   at least one sealing element for sealing a delivery channel for delivering windscreen washer fluid of a member of a blade,
   wherein said at least one sealing element comprises an end channel, configured to be brought into fluid communication with said delivery channel when said delivery channel is sealed;
   at least one spray opening originating at said end channel and arranged facing an opening provided in a first lateral wall of the cap, the opening of the first lateral wall being arranged to allow fluid ejected at the at least one spray opening to be projected out of the cap,
   wherein the cap has a longitudinal main orientation, and wherein said opening of the first lateral wall has a projection direction with an orientation that is orthogonal to the longitudinal main orientation of the cap
   wherein the at least one sealing element is separated from the first lateral wall of the cap by a recess.

2. The cap according to claim 1, wherein each sealing element and each end channel has a longitudinal orientation.

3. The cap according to claim 2, further comprising at least one spray opening in the form of a channel.

4. The cap according to claim 1, wherein the at least one sealing element is two sealing elements.

5. The cap according to claim 1, further comprising:
   a first face defining a housing configured to receive the end of the member; and
   a second face opposite the first face according to the longitudinal main orientation of the cap and closed by an end wall,
   the first face and the second face being connected to each other by the first lateral walls and a second lateral wall.

6. The cap according to claim 5, wherein each sealing element extends along one of the lateral wall of the cap and emerges at the first face of the cap.

7. The cap according to claim 5, further comprising at least one spray opening
   emerges on the outside of said cap and/or at a lateral wall of the cap.

8. The cap according to claim 1, further comprising at least a first housing for receiving a vertebra of the blade and a second housing for receiving a heel of a wiper strip of the blade.

9. A member for a wiper blade, comprising at least one channel for delivering windscreen washer fluid, the member having at least one end cap according to claim 1.

10. The member according to claim 9, wherein each delivery channel is sealed by a one of the at least one sealing elements, each end channel being arranged at least partially inside a delivery channel.

11. The member according to claim 9, further comprising at least one spray opening oriented towards said at least one cap.

12. The member according to claim 9, wherein the at least one channel comprises two channels for delivering windscreen washer fluid, each channel extending along a lateral face of the member.

13. The member according to claim 1, wherein the member is a cover member of the blade, said member comprising an aerodynamic deflector.

14. A wiper blade comprising at least one end cap according to claim 1.

15. A method for manufacturing an end cap according to claim 1, the method comprising the formation of the end channel in said at least one sealing element and the formation of the at least one spray opening originating at said end channel and emerging on the outside of said cap.

16. The method for assembling an end cap according to claim 1 to a member for a wiper blade comprising at least one channel for delivering windscreen washer fluid, the method comprising:

sealing said at least one delivery channel of the member with the sealing element of the cap, in such a way as to bring said at least one delivery channel into fluid communication with the end channel of said sealing element.

17. A wiper blade end cap, comprising:

at least one sealing element for sealing a delivery channel for delivering windscreen washer fluid of a member of the blade, wherein said at least one sealing element comprises an end channel, configured to be brought into fluid communication with said delivery channel when said delivery channel is sealed;

at least one spray opening originating at said end channel and arranged facing an opening provided in a lateral wall of the cap, the opening of the lateral wall being arranged to allow fluid elected at the at least one spray opening to be projected out of the cap, wherein the cap has a longitudinal main orientation, and wherein said opening of the lateral wall is in the form of a channel and has an orientation that is orthogonal to the longitudinal main orientation of the cap wherein the at least one sealing element is separated from the lateral wall of the cap by a recess.

* * * * *